April 1, 1952  E. K. ROSE ET AL  2,591,011
COMPENSATING DIFFERENTIAL CONTROL MECHANISM
Filed Nov. 15, 1949
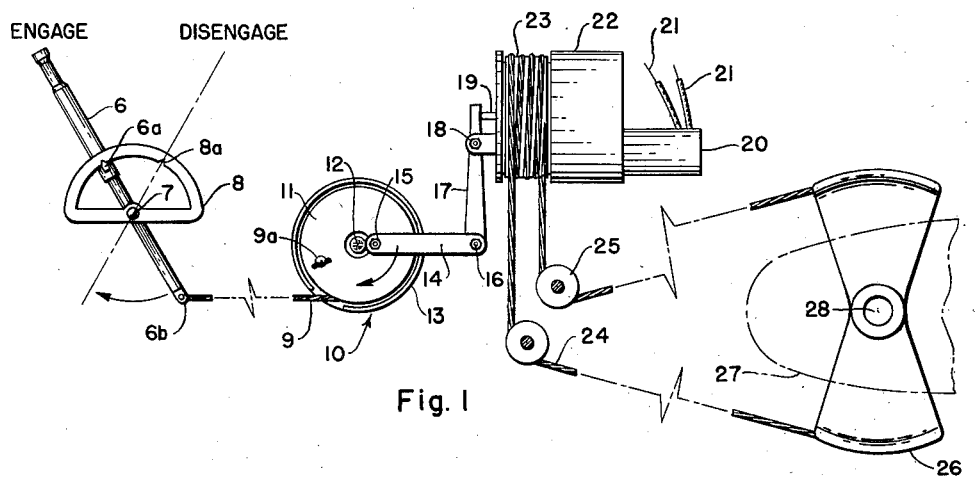
Fig. 1
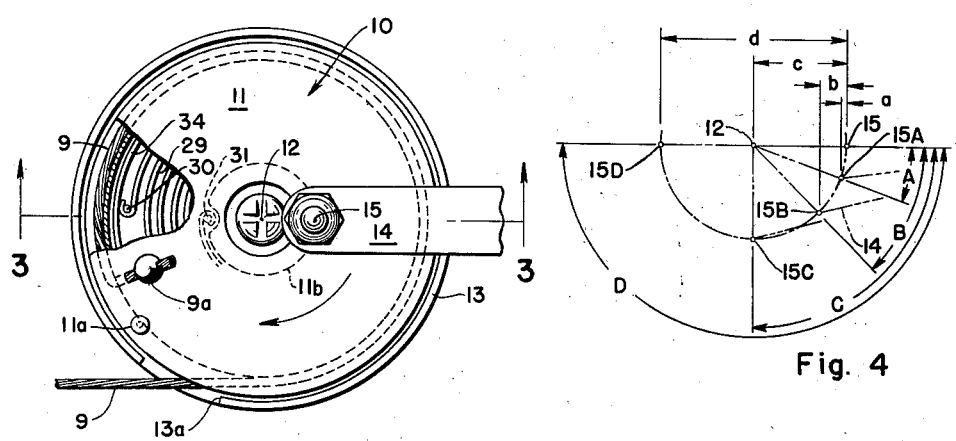
Fig. 2
Fig. 4
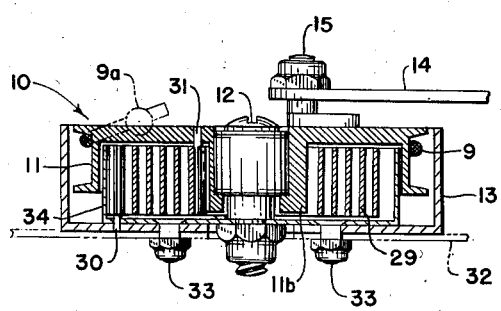
Fig. 3
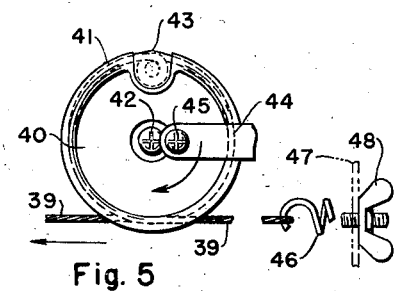
Fig. 5
INVENTORS.
Erwin K. Rose &
Fred R. Prill
THEIR PATENT ATTORNEY.

Patented Apr. 1, 1952

2,591,011

UNITED STATES PATENT OFFICE 2,591,011

COMPENSATING DIFFERENTIAL CONTROL MECHANISM

Erwin K. Rose, Santa Monica, and Fred R. Prill, Inglewood, Calif., assignors to North American Aviation, Inc.

Application November 15, 1949, Serial No. 127,422

8 Claims. (Cl. 74—501.5)

The present invention relates generally to control mechanisms and more particularly to improved means for compensating for, and minimizing the effects of, changes in the length of control cables and other operating elements.

In control systems it is frequently necessary to remotely control a member from a distant point through an extensive cable length which may be subjected to changes in length due to temperatures changes, stresses and from other causes. In certain of these control systems, it is important that the original adjustment or rigging tension in the cable or other operating elements be substantially uniformly maintained in order to prevent faulty operation of the controlled device. These conditions are met with frequently in the control systems of aircraft which are subjected to extreme differences in temperatures, as well as to deflections of the main structure which contribute to major changes in the length of the operating elements.

The present invention relates to an improved compensating mechanism, or motion reducing means, which may take the form of a spring-biased drum element about which the control cable is wrapped and attached, and to which an actuating link is eccentrically pivoted for differential motion. The mechanism is arranged such that control movement of the drum element through substantially 180° will cause actuation of the desired controlled device but any linear change in the control cable due to temperature and stress conditions of the structures will, however, be materially reduced to a relatively small movement of the actuating link to thereby prevent undesired actuation of the controlled device.

It is, accordingly, a major object of the present invention to provide an improved control system for remotely operating a controlled member or device. It is a further object to improve such systems by the inclusion of a compensating differential or motion-reducing mechanism which will prevent transmission of undesired forces from a control cable into the actuating mechanism. It is a further object of the present invention to provide an improved differential compensating mechanism comprising a drum member to be engaged by the control cable, in which the drum member is adjustably spring-biased to maintain the desired adjustments or rigging tension in the control cable. It is a further object to provide such a compensating mechanism with a differentially arranged actuating link whereby extensive linear changes in the control cable are reduced to minor ineffective movements of the actuating link. A further object resides in the specific application of the improved compensating differential mechanism to the operating mechanism for a servomotor clutch in an automatic control system for aircraft.

Other objects and advantages of the present invention will become apparent to those skilled in the art after reading the present description in conjunction with the accompanying drawings, forming a part hereof, in which:

Fig. 1 is a diagrammatic view of the improved control system for an aircraft control surface to which the present compensating differential mechanism has been applied;

Fig. 2 is an enlarged detail view of the improved compensating differential means with a portion of the drum broken away;

Fig. 3 is a cross-section view of the same as taken along the lines 3—3 of Fig. 2;

Fig. 4 is a diagrammatic illustration of the respective movements of the actuating link for corresponding angular movements of the cable drum; and Fig. 5 is a view of a modified form of the improved mechanism in which an external spring is provided.

Referring now to the diagrammatic showing of the improved control system shown in Fig. 1, the numeral 6 represents a manually operated control lever which is pivotally mounted upon suitable fixed structure at the pivot 7 adjacent the quadrant 8. The latter is provided with suitable notches 8a which are selectively engageable by the spring-pressed detent 6a of the control lever 6 whereby the latter is retained in its engaged and disengaged positions. The lower terminal of the control lever 6 is connected at 6b to the control cable 9, which in turn is connected to the improved compensating differential mechanism 10 as by means of a suitable cable terminal 9a. The mechanism 10 comprises essentially a spring-biased rotatable drum 11 which is pivotally mounted upon the pivot 12, suitably attached to fixed supporting structure and housed within the fixed casing 13. In the event a swaged ball terminal is used at 9a, an adjustable terminal 6b or a suitable intermediate turnbuckle should be provided for assisting in adjusting the spring bias on the drum 11 to the desired rigging tension.

The improved compensating differential mechanism 10 is shown in Figs. 2, 3 and 4 and will be described below in greater detail. It will be sufficient to note at this point, however, in connection with Fig. 1, that an actuating link 14 is pivotally connected at the pivot 15 to the rotatable drum 11 at a position which is eccentric or displaced radially from the pivot axis 12 about which the drum 11 is rotatable for operation in the direction of the arrow and against the opposition of suitable spring means to be further described below. The opposite terminal of the actuating link 14 is pivotally connected to the lower terminal 16 of the actuator arm 17 which in turn is pivotally mounted at 18 such that its upper terminal bears against the outer rounded terminal of the clutch actuating pin 19. The servomotor 20 is suitably connected, as by the electric leads 21, to the automatic pilot system, and through which control impulses are transmitted from the system for translation by the motor and its attached mechanism into the required movement of a control surface in the proper corrective direction. The electric motor 20 is suitably connected to reduction gearing housed within the casing 22 and to a clutch actuated by the pin 19 which can selectively be placed in engagement with the motor cable drum 23. The operating cable 24 is engaged with, and encircles, the motor cable drum 23 in such manner that rotation of the latter transmits positive movement to the cable 24 as it extends over the idler sheaves 25 to the sector 26, fixedly attached to the control surface 27, which is pivotally mounted upon the structure at the pivot 28.

The system which is illustrated in Fig. 1 is such as may be found in aircraft in which both manual and automatic pilot control systems are provided for movement of the control surfaces and provides an improved means for remotely engaging or disengaging the automatic control at a point preferably adjacent the control surface. Such conditions require that the control lever 6 be disposed in the aircraft cockpit or otherwise accessible to an operator, and with the mechanism 10 and the servo mechanism 20 located adjacent the control surface 27, it necessarily means that the control cable 9 is frequently of considerable length due to the remote disposition of the lever 6 with respect to the mechanism 10. The control cable 9 will, accordingly, be subject to appreciable variation in its length due to expansion and contraction resulting from extreme temperature changes, or from other causes. Normally such changes in the length of the control cable or other actuating mechanism would impart sufficient movement of the actuating arm 17 about the pivot 18 as to cause disengagement of the clutch through corresponding movement of the clutch pin 19. Such undesired actuation of the clutch is, however, prevented by the compensating differential mechanism 10 which under extensive variation in length of the control cable 9 will reduce such movements materially and prevent their transmission to the actuating pin 19.

Referring now to Figs. 2 to 4, inclusive, it will be seen that the control cable 9 encircles the periphery of the drum 11 of the mechanism 10 to an extent somewhat less than a complete encircling of the rotatable drum which is pivoted upon the anti-friction bearing mounted upon the fixed stud 12. The end face of the drum 11 is suitably apertured to permit passing of the cable 9 therethrough and to be engaged by the ball detent 9a affixed to the end thereof. The fixed housing 13 is suitably apertured as at 13a to permit passage or entrance of the cable 9 therethrough and the housing 13 is fixedly attached to suitable supporting structure 32 as by the mounting bolts 33. The drum 11 and the housing 13 are nested one within the other, being coaxially disposed with their circular wall portions facing oppositely to form a cylindrical overall assembly. Similarly nested within the elements 11 and 13 is a spring housing 34 which is also coaxially mounted in relation to the nested elements, the housing 34 facing in the same direction as the outer drum housing 13 to which it is fixedly attached by the bolts 33. A flat band or clock-type spring 29 is housed within the inner spring housing 34 with its outer terminal anchored to the housing 13 by the pin or abutment 30, and the inner terminal of the torsion spring 29 similarly anchored to the drum 11 by means of the pin 31 adjacent the hub 11b of the drum.

As viewed in Fig. 2, the spring 29 extends inwardly in the clockwise direction such that rotation of the drum 11 in the clockwise direction indicated by the arrow from the neutral or normal position shown in this figure would be resiliently opposed by winding or tightening of the spring 29, about the depending hub portion 11b of the drum 11. In order to facilitate assembly of the clock spring 29 within the spring housing 34 and in relation to the drum 10, there is provided a temporary pin 11a as shown in Fig. 2, which may be inserted within aligned holes in the flange of the drum 11 and the outer casing 13 to facilitate initial rigging of the assembly. Inasmuch as it is necessary to wind the torque spring up before installation, this pretensioning of the spring with the aid of the pin 11a serves as a means for securing the initial spring tension. After assembly of the various elements and the proper adjustment of the length of the cable 9, the pin 11a may be removed, thereby imposing the desired load upon the cable. In an actual construction which has proven satisfactory in an aircraft installation, the initial spring force has been set at between 5 and 10 pounds at which the mechanism has given satisfactory results.

Reference to the diagram in Fig. 4, will indicate the effects of various movements of the control cable 9 as they are reflected by corresponding lesser movement of the eccentrically disposed pivotal connection 15 for the actuating link 14. In this figure, the point 12 represents the axis of the central pivot 12 as viewed in Fig. 2, and the numeral 15 represents the corresponding pivotal axis of the eccentric pivot 15. As the control cable 9 may be pulled or moved toward the left in Figures 2 and 4, imparting clockwise rotation to the cable drum 11, the pivot 15 is caused to be rotated downwardly against the opposition of the torque spring 29 to the position indicated by the point 15A, represented by a rotation of the drum 11 through the angle A. During this movement of the control cable 9 equivalent in distance to the length of the arc, or that part of the circumference of the drum 11 subtended by the angle A, the actual lateral displacement of the pivot 15 inwardly toward the vertical centerline of the device is represented by the short distance a and the actual displacement of the axis of the pivot 16 is a relatively small distance slightly greater than the distance indicated a. Similarly, continued rotation of the drum 11 caused by further pull on the cable 9 to the left in these figures, causes the axis of the pivot 15 to be moved downwardly and forwardly in the direction of the cable pull to the point 15B corresponding to rotation through the angle B, representing a forward displacement of the pivot 15 through the distance b and a correspondingly slightly greater forward displacement of the axis of the pivot 16 at the rearward terminal of the actuating link 14.

In a similar manner, further movement of the cable 9 causes the point 15 to reach the point 15C through a quarter turn or 90° in the clockwise direction equivalent to the angle C, imparting forward movement of the pivot 15 through the distance $c$. Likewise, rotation through the 180° angle D causes the pivot 15 to reach the point 15D imparting a total displacement in the forward direction of the axis of the pivot 16 equivalent to the distance $d$. To disengage the clutch for the servo unit the drum 11 is rotated in the clockwise direction from the neutral position shown in Figs. 1 and 2 through substantially the angle D at which the control lever 6 may be latched in the disengaged position indicated by the construction in Fig. 1. In an actual compensating differential device, a change in the cable length of ½″ due to temperature changes or other conditions resulting in undesired forward movement of the cable 9 from the neutral position, caused approximately a 20° angular displacement in the position of the point 15, resulting in a movement of the axis of the pin 16 corresponding to a relatively small fraction of this distance and of insufficient magnitude to cause disengagement of the servomotor clutch. This ½″ undesired movement, accordingly, produced very little longitudinal movement of the link 14 and consequently the servo engaging clutch controlled by movement of the pin 19, with which the link and the actuating arm 17 is in engagement, did not affect operation of the clutch. The flat coil spring 29 insures return of the drum and the operating cable 9 to maintain the desired rigging load on the cable and the outer housing 13 serves as a cable guard about the cable, spring and the drum 11.

A simplified modification of the improved compensating differential mechanism is shown in Fig. 5, in which the control cable 39 is continuous and extends a complete turn around the sheave 40 within the peripheral groove 41 extending rearwardly to a connection with the adjustable tensioning spring 46. The sheave 40 is pivotally mounted for rotation about the fixed pivot 42 which is mounted upon fixed supporting structure similar to the pivot 12 of the foregoing modification and the cable 39 is locked in positive engagement within the cable groove 41 by a suitable cable lock indicated at 43. This may be a lock of the type disclosed in Patent No. 2,225,845 which issued December 24, 1940. An actuating link 44 is pivotally connected at an eccentric or offset pivotal connection 45 with the sheave 40 and is adapted to be moved in the clockwise direction indicated by the arrow in this figure about the pivotal axis 42. Such movements may, as described above, be caused either by pilot control movements or may be undesired movements due to expansion or contraction of the cable 39. Should the cable 39 expand while the actuating link 44 is in the neutral position, shown in this figure, the pivot 45 will move in the counterclockwise direction from the position shown due to the initial rigging tension applied by the spring 46 adjustably mounted by the thumb screw or other adjusting means 48 upon the fixed abutment 47. In this alternate form of the unit, which has been operating satisfactorily in actual aircraft service, the cable 39 completely encircles the periphery of the sheave 40 and is secured to the same, by the lock 43, which it also encircles, at a point approximately 180° from the point of entry and exit of the cable 39. The free end of this cable in being attached to the adjusting spring 46, provides a modification which is of greater simplicity than that shown in the preceding figures and one in which the rigging tension is more readily applied and adjusted. It will be understood that in either modification, variation of the drum or sheave diameter and the eccentricity of the pivotal connection 15 or 45 will permit corresponding variations in the predetermined controlled and undesired movements and will be adequate to meet the requirements of any specific installation.

Other forms and modifications of the present invention which may occur to those skilled in the art after reading the foregoing description are intended to come within the scope and spirit of the present invention, as more particularly defined in the appended claims.

We claim:

1. In a control system, means for compensating for linear changes in a control cable comprising a rotatable element having a central axis of rotation, said rotatable element having a peripheral edge engaged by a terminal of said control cable, an actuating link pivotally connected to said rotatable element for independent rotation about a point offset from the axis of rotation of said rotatable element and resilient means including a torsion spring in engagement with said rotatable element opposing movement of said control cable and rotation of said rotatable element.

2. In a control system, means for reducing undesired linear movements of a control element to movements ineffective to cause actuation of a controlled element, said means including a pivotally mounted spring-biased drum element, a control element having a terminal engaging the periphery of said pivotally mounted element spaced from said pivotal mounting and an actuating link element pivotally engaging said pivotally mounted drum element for independent rotation about a separate axis disposed between said periphery and said pivotal mounting.

3. In a flexible control system having a control element and a controlled element, means for reducing undesired movements within the flexible control system due to changes in the length of the control element comprising a pivotally mounted spring-biased element peripherally engaged by said flexible control element at a distance from the axis of said pivotation, and an actuating link operatively connected at a first terminal to a controlled element, said actuating link being pivotally connected at its opposite terminal to said pivotally mounted element at a point closer to said axis of pivotation than the radius of said peripheral engagement of said flexible control element with said pivotally mounted element.

4. In a control system having a control cable subject to changes in linear dimension, a control lever element attached to said cable for controlled movement thereof, and a controlled member arranged to be moved by movement of said control lever element and said control cable, the improvement of compensating differential control means including a spring-biased rotatable element and a link eccentrically pivoted to said rotatable element interconnecting said cable with said controlled member arranged to reduce said linear dimension changes of said cable due to the differential movement of said link caused by said eccentric pivotation to prevent the full effect of said changes from reaching said controlled element.

5. The combination with a control cable subject to changes in linear dimension, a control lever element attached to said cable for controlled movement thereof, and a controlled member arranged to be moved by movement of said control lever element and said control cable, of motion reducing means including a spring-biased rotatable drum element mounted upon a centrally disposed pivot and a link eccentrically pivoted to said rotatable element interconnecting said control cable with said controlled member, said control cable engaging the periphery of said rotatable drum element at a point farther from the axis of rotation of said rotatable drum element than the pivotal connection of said link to said rotatable drum element, said link normally radially disposed with respect to said rotatable drum element for movement with said drum element to substantially a diametrically opposite pivotal position arranged to reduce the said linear dimensional changes of said control cable to prevent the full effect of said changes from reaching said controlled member by imparting partial rotational movements to said rotatable drum element and to the attached terminal of said link.

6. In a control system having a control lever, a cable element and a controlled element, means for reducing undesired movements within the control system due to changes in the length of the control cable comprising a pivotally mounted element peripherally engaged by said control cable at a distance from the axis of said pivotation, an actuating link operatively connected at a first terminal to said controlled element, said actuating link being pivotally connected to said pivotally mounted element in a normally radial disposition at a point closer to said axis of pivotation than the tangent point of peripheral engagement of said control cable with said pivotally mounted element, said actuating link arranged for separate pivotal movement with respect to said pivotally mounted element, and resilient means in engagement with said pivotally mounted element arranged to resiliently oppose movement of said pivotally mounted element about its axis of pivotation resulting from changes in the length of said control element with a minimum concurrent movement of said actuating element.

7. The combination with a control system having a control cable subject to undesired lengthening and a controlled element arranged to be moved through a predetermined distance between engaged and disengaged positions by manual operation of said control cable, of means for reducing said undesired change in linear dimension of said control cable below that predetermined movement required for operation of said controlled element comprising a rotatable element mounted upon a fixedly supported pivot axis and peripherally engaged by said control cable at a distance from said pivot axis, resilient torsion means engaging and urging said rotatable element in the direction in which it predeterminedly tightens said control cable, and an actuating link pivotally connecting said rotatably element at a point spaced from its pivotal axis with said controlled element, said actuating link disposed in a substantially radial arrangement with respect to said pivot axis in the engaged and disengaged positions of said controlled element such that undesired change in length of said control cable imparting rotation to said rotatable element is materially reduced in its transmission to said controlled element by said rotatable element and said actuating link.

8. The combination with a control system having a control cable subject to undesired lengthening and a controlled element arranged to be moved through a predetermined distance by manual operation of said control cable, of means for reducing said undesired change in linear dimension of said control cable below that predetermined movement required for operation of said controlled element comprising a rotatable element mounted upon a fixedly supported pivot axis and peripherally engaged by said control cable at a distance radially from said pivot, resilient means opposing rotation of said rotatable element, and an actuating link pivotally interconnecting said rotatable element with said controlled element at a pivotal connection with said rotatable element at a point closer to its axis of rotation than the point at which it is engaged by said control cable, said actuating link disposed substantially radially with respect to said pivot axis in both the engaged and disengaged condition of said controlled element in such manner that undesired change in length of said control cable imparting rotation to said rotatable element is materially reduced in its transmission to said controlled element by said rotatable element and said actuating link.

ERWIN K. ROSE.
FRED R. PRILL.

REFERENCES CITED

The following references are of record in the file of this patent:

UNITED STATES PATENTS

| Number | Name | Date |
|---|---|---|
| 2,169,813 | Parkin | Aug. 15, 1939 |
| 2,280,105 | Sturgess | Apr. 21, 1942 |
| 2,296,535 | Nutt | Sept. 22, 1942 |
| 2,324,475 | Arens | July 20, 1943 |
| 2,351,155 | Searle | June 13, 1944 |
| 2,371,130 | Cushman | Mar. 13, 1945 |